United States Patent [19]

Klaüke et al.

[11] 4,018,955

[45] Apr. 19, 1977

[54] PROCESS FOR PRODUCING A RING-SHAPED ONE-COLOR OR MULTI-COLOR RIBBON AND A RIBBON PRODUCED IN ACCORDANCE WITH THIS PROCESS

[75] Inventors: Güenter Klaüke, Munich; Anton Wimmer, Bad Toelz, both of Germany

[73] Assignee: Siemens Aktiengesellschaft, Berlin & Munich, Germany

[22] Filed: July 29, 1975

[21] Appl. No.: 600,059

[30] Foreign Application Priority Data

July 31, 1974 Germany .......................... 2436928

[52] U.S. Cl. .............................. 428/57; 156/73.4; 156/306; 156/502; 156/580.1; 197/172; 428/198; 428/207

[51] Int. Cl.² ........................................ B32B 31/20

[58] Field of Search .......... 197/172, 168, 157, 158; 156/502, 306, 73.4; 428/207, 198, 57, 58; 156/73.1, 580.1, 580.2

[56] References Cited

UNITED STATES PATENTS

| 2,242,403 | 5/1941 | Neidich | 428/207 |
|---|---|---|---|
| 2,793,153 | 5/1957 | Grundel | 197/172 |
| 3,111,441 | 11/1963 | Grundel | 156/157 |
| 3,666,602 | 5/1972 | Obeda | 156/73.4 |
| 3,725,164 | 4/1973 | Albinger et al. | 156/73.4 |

*Primary Examiner*—Edward G. Whitby
*Attorney, Agent, or Firm*—Hill, Gross, Simpson, Van Santen, Steadman, Chiara & Simpson

[57] ABSTRACT

A continuous or ring-shaped printing ribbon is constructed by overlapping the ends of a length of ribbon made of thermoplastic synthetic material and welding the overlapped ends together along a grid work of fine weld lines, thereby providing a weld joint comprising a punctiform arrangement of ink-bearing cells to effect an undisturbed emission of ink across the joint during a printing operation.

6 Claims, 2 Drawing Figures

PROCESS FOR PRODUCING A RING-SHAPED ONE-COLOR OR MULTI-COLOR RIBBON AND A RIBBON PRODUCED IN ACCORDANCE WITH THIS PROCESS

BACKGROUND OF THE INVENTION

This invention relates generally to the field of ribbons used in printing operations such as in connection with teleprinters, wherein a type or needle of a printing head strikes the ribbon to produce printed matter on a document or the like, and more particularly to such ribbons which are continuous or ring-shaped and which are formed by connecting in fixed assembly the ends of a finite length of ribbon. Such ribbons are composed of thermoplastic synthetic material and the connection between the ends of the length of ribbon is formed by overlapping the ribbon ends and providing a welded joint between the overlapped portions.

In the construction of continuous or endless thermoplastic ribbons used in printing operations it is known to connect the ends of a finite length of ribbon by overlapping the same and gluing the overlapped portions with the aid of an interposed thermoplastic filament. The thermoplastic filament is held taut in the region of the portion thereof which is to be glued, and then the ends of the ribbon are joined by fusing the filament to the overlapped portions under conditions of pressure and heat. It is also known to connect the overlapped ends by means of an ultrasonic weld process. Continuous ribbons which are constructed in either of these two ways have a disadvantage, however, that in the region of the overlapped ribbon end portions connected by adhesion or an ultrasonically welded joint the thermoplastic material of which the ribbon is composed fills up the ink cells formed in the ribbon. Thus during a printing operation, e.g., in a teleprinter, when a type or needle of the printing head strikes against the joint in the ribbon, the application of the ink to the paper sheet or the like which is to be imprinted does not occur at all or else occurs only to an incomplete extent. Furthermore, either of these two constructions is possible only in connection with one-color ribbons. When either of such connection joints is utilized in connection with a multi-color ribbon, the colors become blurred in the region of the adhesion or welding joint. This occurs even in connection with the use of nylon fabrics, which have been widely and advantageously utilized as material for the ribbons.

A principal object of the present invention is to provide a method for constructing a continuous ribbon, having overlapped welded joints, which enjoys a high mechanical stability and strength but which also provides uninterrupted and undisturbed printing across the length of the welded joint as the joint moves past the type or needle of the printing head. Another object is to provide a multi-color ribbon having a welded joint in which the colors are maintained distinct and are not merged or blurred in the region of the welded joint. A further object is to provide a continuous ribbon having such salutary features, as well as an improved sonotrode.

SUMMARY OF THE INVENTION

The present invention may be summarized as comprising either a single or multi-color continuous ink ribbon for use in printing operations such as teleprinting and the like, which is made of synthetic thermoplastic material having overlapped end portions which are welded in grid-form to provide a raster-like arrangement of ink-bearing cells or pockets capable of producing uninterrupted printing when struck by a needle or type of a printing head.

The invention also embraces a method for making such a continuous ribbon in which the ends of a finite length of the ribbon are overlapped and the overlapped portions are welded under conditions of heat and pressure, but not over the entire area of the overlapped and abutting surfaces, but instead only at regularly spaced intervals and along the short fine lines of a grid-like network of welded joints. Thus the non-welded spaces of the overlapped end portions between the weld lines produce a cellular structure composed of ink-bearing pockets, such that a strong welded connection is provided without the disadvantages of previously known welded connections, namely, the diminution of the inking or printing quality of the ribbon across the welded joint, and the restriction of the utilization of such joint to monochromatic ribbons.

In a preferred embodiment of the invention the grid-like network of welded joints is formed by means of a metal mesh, between two sheets of which the overlapped end portions of the ribbon are positioned. The mesh sheets are in register with one another and are applied respectively to the remote outer surfaces of the overlapped end portions of the ribbon under conditions of temperature and pressure such that only those line surfaces of the abutting faces of the overlapped end portions are welded together, the spaces therebetween being essentially free of any effects of the welding process.

Since the welded joints do not cover the whole of the abutting surfaces of the ribbon end portions but are instead effected only in a punctiform fashion or in the form of short, thin, spaced lines, the welded joint taken as a whole possesses a sufficiently large number of ink-bearing pockets or cells to facilitate an undisturbed emission of ink to a paper sheet or other printed matter during the printing operation. Furthermore it is possible to so weld the end portions of a ribbon having two or more color tracks without blurring the printed matter in the region of the welded joints.

Preferably the conditions of pressure and temperature under which the grid-like network of fine line welded joints are formed are produced ultrasonically, whereby the overlapped ribbon end portions are "hammered" at an ultrasonic rate, the result of which is to generate sufficient heat in the ribbon material to fuse the impacted portions thereof. While the working face of the hammer or sonotrode may be arranged to engage one of two sheets of metal wire mesh between which the overlapped end portions of the ribbon are sandwiched, the present invention also comprehends the elimination of one of the sheets of mesh and the use of a sonotrode having grid-like prominences formed thereon which correspond to the grid-like formations on the remaining mesh, which serves as an anvil.

In addition to the foregoing, many other features, advantages and additional objects of the present invention will become manifest to those versed in the art upon making reference to the detailed description which follows and the accompanying sheets of drawings, in which preferred structural embodiments incorporating the principles of the present invention are shown by way of illustrative example only.

DESCRIPTION OF THE PREFERRED EMBODIMENTS

The ribbon of the present invention is produced from a finite strip or length of ribbon made of synthetic thermoplastic material, whereby the ends of the ribbon are overlapped and welded under conditions of pressure and temperature to produce a continuous or ring-shaped ribbon. As contrasted with the prior art, however, the overlapped ends of the ribbon are welded together in grid-form in a manner such that ink cells or pockets which are saturated with ink are maintained in the region of and across the welded portions of the ribbon ends.

Preferably, the overlapped ends of the ribbon are joined or welded together ultrasonically. The overlapped ends are positioned between two sheets of fine metal wire mesh and the sonotrode of the ultrasonic welding apparatus oscillates in abutting relation with one of the sheets, the other of which serves as an anvil. As noted hereinafter, however, one of the sheets of mesh may be eliminated by forming grid-like prominences on the working face of the sonotrode, while the second sheet of mesh still serves as an anvil.

Figure 1:
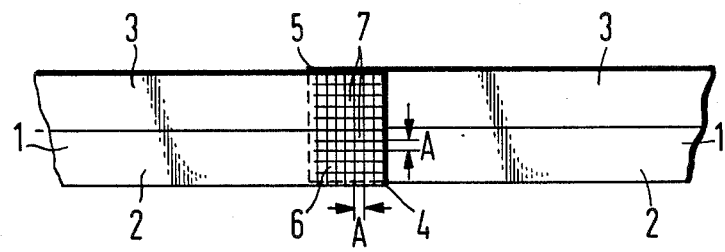
FIG. 1 is a top plan view of the overlapped welded end portions of a continuous ribbon constructed in accordance with the principles of the present invention.

FIG. 1 discloses a ribbon 1 of finite length and made of synthetic thermoplastic material, preferably nylon. The ribbon 1 comprises two color tracks 2 and 3, and the ends of the ribbon, which are indicated at reference numerals 4 and 5, are disposed in overlapping relation. Preferably the ends 4 and 5 of the ribbon 1 are overlapped a distance of approximately 1 millimeter (mm.). The overlapped portions of the ends 4 and 5 are welded together under conditions of pressure and temperature, and the overlapped welded portions of the ends 4 and 5, indicated at reference numeral 6, possess a cellular structure which, as illustrated in FIG. 1, may be line-raster-shaped. It will be appreciated, however, that the raster can also be punctiform or annular in configuration.

The cellular structure is comprised of a number of cells or pockets indicated at reference numeral 7 which serve as carriers of printing ink. During a printing operation, for example, when a type or needle of a printing head strikes against the welded portions 6, a sufficient quantity of ink can be transferred to the printed surface. In addition, even though the overlapped end portions of the ribbon 1 are welded together only along the rectangular lines which serve as the boundaries of the cells 7, the welded joint is sufficiently strong to resist the tensile stress exerted, for example, by the transport mechanism which moves the ribbon 1.

Figure 2:
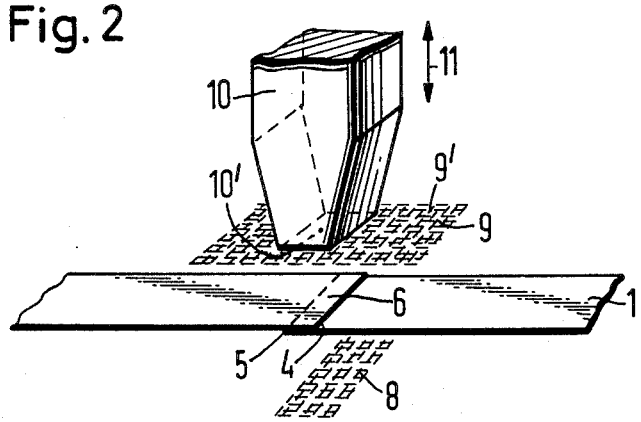
FIG. 2 illustrates the overlapped end portions of a ribbon sandwiched between two sheets of wire metal mesh and the sonotrode of an ultrasonic welding mechanism disposed in spaced relation to one of the sheets for producing a welded joint in accordance with the invention.

Referring to FIG. 2, the welded connection may be provided by overlapping the ends 4 and 5 of the ribbon 1 a distance of approximately 1mm. The overlapped portion 6 is then disposed between two sheets of metal wire mesh indicated at reference numerals 8 and 9. The distance between the sheets 8 and 9 has been exaggerated in FIG. 2 simply for the purpose of clarity of the drawing, and during formation of the welded joint are actually placed in abutment with the opposite face of the overlapped ends 4 and 5.

Disposed in spaced relation to the upper mesh 9 is the sonotrode 10 of an ultrasonic welding mechanism, the details and operation of which are well known to those skilled in the art. An operating or working surface 10' of the sonotrode 10 is disposed in facing relation to the upper wire mesh 9.

In operation, the sonotrode 10 is energized before the working surface 10' thereof engages the wire mesh 9 and oscillates in a direction indicated by an arrow 11. The ultrasonic oscillations are transferred from the sonotrode 10 to the upper wire mesh 9, and thence through the overlapped portion 6 of the ribbon ends 4 and 5 to the lower metal mesh 8, which serves as an anvil. The overlapped portions of the ribbon 1 are thereby welded in accordance with the pattern of the mesh formed in the sheets 8 and 9.

The mesh 8 is particularly advantageous since it avoids the danger of areal welding. The cellular structure of the welded joint is more durable when an "anvil mesh" is utilized and, in addition, the use of the mesh eliminates the problem of blurring when a continuous ribbon having two or more color tracks is formed.

The grid-like prominences formed by virtue of the upper mesh 9 can be formed integrally on the working surface 10' of the sonotrode 10, thereby eliminating the upper mesh 9 or, if desired, both meshes 8 and 9. In that event, however, the cleansing process for the working surface 10' of the sonotrode 10 is more complicated than the cleansing process that may be required by virtue of the utilization of the meshes 8 and 9. With respect to the meshes 8 and 9, preferably they are made of chrome steel in a manner whereby the spacing between the wires or prominences thereof as indicated at reference characters A in FIG. 1 does not exceed 200 microns.

As a consequence of the present invention the overlapped end portions 4 and 5 of the ribbon 1 are welded together in fixed assembly in a very strong weld connection, but the weld does not extend across the entire abutting and interfacing surfaces of the ends 4 and 5, but instead the weld is formed merely by virtue of a multiplicity of weld lines, arranged in the form of a grid, whereby the spaces between the weld lines form ink-bearing cells. Thus as the welded joint of the continuous ribbon passes across the needle or the like of a printing head, the printed matter is not interrupted, even when a multi-color ribbon is utilized.

Although minor modifications might be suggested by those versed in the art, it should be understood that I wish to embody within the scope of the patent warranted hereon all such modifications as reasonably come within the scope of my contribution to the art.

We claim:

1. In a ring-shaped ribbon made of thermoplastic material having at least one color track and formed from a strip of the ribbon of finite length, the end portions of which are overlapped and fused to form a continuous ribbon, the improvement wherein the overlapped end portions of the ribbon strip are welded in grid form to provide a series of spaced welded line joints having ink-bearing cells therebetween.

2. The invention as defined in claim 1 in which said ribbon comprises more than one color track.

3. In the method of making a ring-shaped thermoplastic ribbon having at least one color track, by overlapping the end portions of a strip of the ribbon of finite length and fusing said end portions to form a continuous ribbon, the improvement wherein said end portions are fused by welding same under conditions of pressure and temperature in a grid form to retain ink-saturated cells within said end portions.

4. The invention as defined in claim 3 in which said overlapping end portions are ultrasonically welded to one another.

5. The invention as defined in claim 4 wherein said ultrasonic welding comprises the steps of disposing the overlapped end portions of the ribbon between a pair of metal wire meshes, and positioning the sonotrode of an ultrasonic welding device in relation to one of said wire meshes to oscillate into engagement therewith.

6. A sonotrode for use in ultrasonic welding device for welding the overlapping end portions of a strip of ribbon to form a continuous ribbon comprising a working surface, and prominences formed on said working surface and arranged in the manner of a grid.

* * * * *